March 16, 1926.
H. A. WALKER
1,577,005
BRAKE STRUCTURE
Filed Dec. 22, 1922
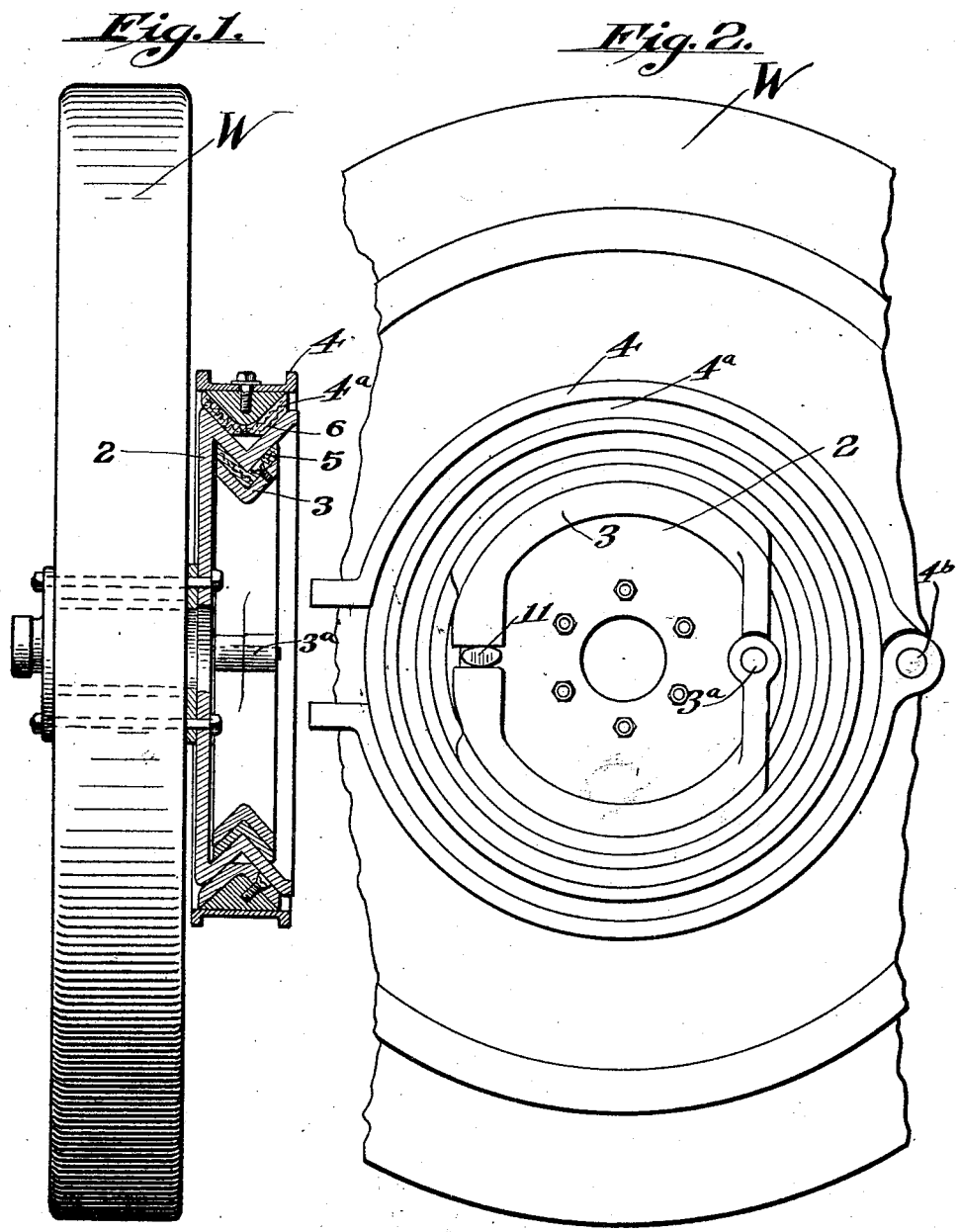
Inventor:
HERBERT A. WALKER.
By Hazard and Miller
Attorneys

Patented Mar. 16, 1926.

1,577,005

UNITED STATES PATENT OFFICE.

HERBERT A. WALKER, OF FULLERTON, CALIFORNIA, ASSIGNOR TO FREDERICK W. SMITH, OF WHITTIER, CALIFORNIA.

BRAKE STRUCTURE.

Application filed December 22, 1922. Serial No. 608,485.

*To all whom it may concern:*

Be it known that I, HERBERT A. WALKER, a citizen of the United States, residing at Fullerton, in the county of Orange and State of California, have invented new and useful Improvements in Brake Structures, of which the following is a specification.

This invention relates to brake structures, and more particularly to brake drums and internal and external shoes therefor.

I am aware that it has been proposed to provide wheel brakes with drums having a plurality of external grooves and internal grooves all peripherally, said grooves having inclined sides. In such proposed form of brake drums the grooves were comparatively shallow and narrow and the inside grooves were offset as to the roots of the outside grooves, or in other words, the inside and the outside grooves were staggered axially of the drum.

My improvement has for an object to provide a brake drum and inside and outside shoes therefor, which drum may be of standard width as compared to usual brake drums for wheels, and which drum is provided with but one exterior V-shaped peripheral groove and a single inwardly projecting angular flange presenting a V-shaped cross section internally through the flange for the purpose of securing a compact arrangement substantially concentrically of outside and inside or internal brake shoe elements. Further, an object is to provide a wheel brake drum having a flange which is substantially V-shaped in cross section and thus presents an outside V contour for a contractile brake band and shoes, and a V-shaped inside surface for expanding brake shoes, all concentric and all having the apices of their angles substantially in a common plane which is perpendicular to the axis of the drum.

Other objects and advantages will be made manifest in the following specification of an embodiment of the invention illustrated in the accompanying drawings, wherein—

Figure 1 is an edge view and diametrical section of a wheel and the improved brake.

Fig. 2 is a side elevation of the wheel, the improved brake parts being broken away.

A wheel W is shown to which there is attached a drum 2 in the usual or any suitable manner. The drum of this invention is shown as comprising a flange of V-shaped cross section and therefore presenting an interior V-shaped surface 5 and an exterior V-shaped surface 6 which is concentric to the interior V-shaped surface 5, or in other words, the root of the exterior V-shaped surface 6 and the apex of the interior V-shaped surface 5 are substantially in a common plane. This provides, therefore, a compact arrangement including a drum flange and an inside expansible brake structure including shoes 3, and the outside contractile brake structure including a band 4 provided with a liner or liner sections $4^a$. The shoes 3 may have liners.

It will be seen that the expansible interior brake shoe or shoe sections 3 have an exterior V-shaped cross section complementary to the angular face 5 of the brake drum flange, and the effective surfaces of the brake lining $4^a$ are complementary to the divergent faces of the V-shaped exterior surface 6 of the drum flange. The interior brake band is shown as comprising circumferential sections which are suitably detachably connected as by a pivot connection $3^a$, and the sections are adapted to be applied to check the rotation of the wheel by any suitable device, as a rotary cam 11.

The outer circumferential band is shown as formed of separable circumferential sections which are suitably connected. In the present case the connecting means includes a pivot device $4^b$.

Further embodiments, modifications and changes may be resorted to within the spirit of the invention as here claimed.

What is claimed is:

1. In a brake apparatus, a drum having a plane side plate for attachment to a given part and being marginally bent to form a lateral, circular flange of V-section presenting a re-entrant groove surface and a salient surface, each of said surfaces being continuous and smooth for application of braking elements; the flange forming an interior corner groove at the juncture of the flange and plate for the reception of the inner corner of a brake element to obtain a close up arrangement of the elements and the plate.

2. In a brake apparatus, a drum comprising a plane plate having an integral, self-sustaining, circular rim including an acutely inturned wall having a face apposite and intersecting the near face of the plate and forming an inner corner groove to obtain compactness in position of a brake element; the rim having an outturned wall to form a grooved perimeter.

3. In a brake apparatus, a drum plate having an acutely inbent marginal rim of V-section having circular inner and outer friction faces, an inner shoe structure straddling the apex face of the flange and lying close up to the plate and in the drum corner angle formed by the inbent wall of the rim, and an external, contracting brake means about the rim.

4. In a brake structure, a drum having a plate with a lateral rim of V-section, and an inside shoe including a segment having integral, meeting, divergent flanges, and a V-section lining carried in the groove of the segment; the rim forming a corner pocket in which one side flange of the segment will lie close up to the drum plate.

In testimony whereof I have signed my name to this specification.

HERBERT A. WALKER.